(12) United States Patent
Lee et al.

(10) Patent No.: US 7,091,995 B2
(45) Date of Patent: Aug. 15, 2006

(54) METHOD FOR MORPHING GEOMETRIC SHAPES BASED UPON DIRECTION MAP

(75) Inventors: Joo-Haeng Lee, Daejon (KR); Hyun Kim, Seoul (KR); Duk-Joo Son, Daejon (KR)

(73) Assignee: Electronics and Telecommunications Research Institute (KR)

( * ) Notice: Subject to any disclaimer, the term of this patent is extended or adjusted under 35 U.S.C. 154(b) by 99 days.

(21) Appl. No.: 10/733,585

(22) Filed: Dec. 10, 2003

(65) Prior Publication Data

US 2004/0125116 A1    Jul. 1, 2004

(30) Foreign Application Priority Data

Dec. 23, 2002    (KR)    ............... 10-2002-0082722

(51) Int. Cl.
*G09G 5/00*    (2006.01)
(52) U.S. Cl. ............... 345/646; 345/619; 382/308
(58) Field of Classification Search ............... 345/646, 345/955, 619; 382/308
See application file for complete search history.

(56) References Cited

U.S. PATENT DOCUMENTS 5,613,048 A * 3/1997 Chen et al. ............... 345/419

FOREIGN PATENT DOCUMENTS

| JP | 2001-175881 | 6/2001 |
|---|---|---|
| KR | 1020020051299 | 6/2002 |
| KR | 2003-48620 | 6/2003 |

OTHER PUBLICATIONS

J.H. Lee, et al.; "Interactive Control . . . Minkowski Sum"; This Preliminary version of this paper was presented in Korean at Korea CAD/CAM Society Conference, Jan. 30, 2002.

* cited by examiner

*Primary Examiner*—Kee M. Tung
*Assistant Examiner*—Michelle K. Lay
(74) *Attorney, Agent, or Firm*—Blakely Sokoloff Taylor & Zafman

(57) ABSTRACT

The present invention provides a method for morphing different geometric shapes while not using algebraic characteristics and overcoming inefficiency of Minkowski sum computation. The method for geometric shape morphing by using direction map so as to smoothly morph more than two different geometric shapes includes the steps of: a) extracting each direction map of the geometric shape; b) merging the direction maps; c) scaling the merged direction map by group; and d) generating a polygon by using an inverse function of a direction map.

22 Claims, 15 Drawing Sheets

FIG. 4
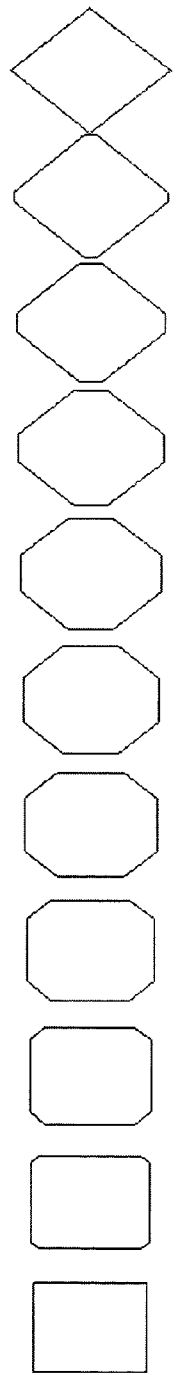
ANGULAR POINT:4
AREA:0.320000
LENGTH:2.262742
ANGULAR POINT:8
AREA:0.343859
LENGTH:2.262742
ANGULAR POINT:8
AREA:0.362415
LENGTH:2.262742
ANGULAR POINT:8
AREA:0.375670
LENGTH:2.262742
ANGULAR POINT:8
AREA:0.383623
LENGTH:2.262742
ANGULAR POINT:8
AREA:0.386274
LENGTH:2.262742
ANGULAR POINT:8
AREA:0.383623
LENGTH:2.262742
ANGULAR POINT:8
AREA:0.375670
LENGTH:2.262742
ANGULAR POINT:8
AREA:0.362415
LENGTH:2.262742
ANGULAR POINT:8
AREA:0.343859
LENGTH:2.262742
ANGULAR POINT:8
AREA:0.320000
LENGTH:2.262742
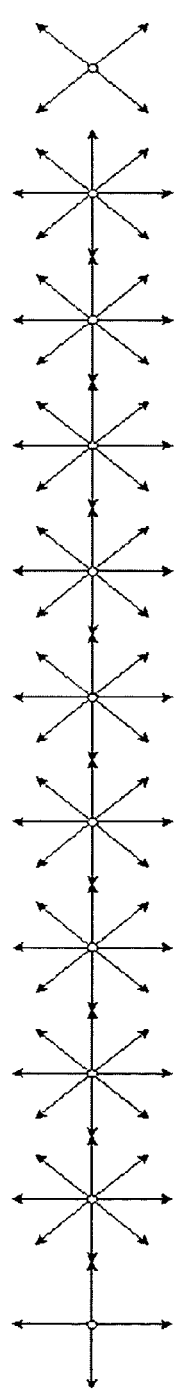
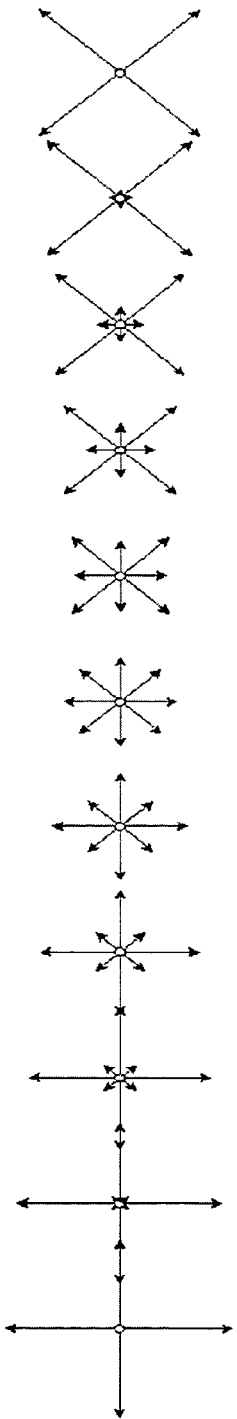

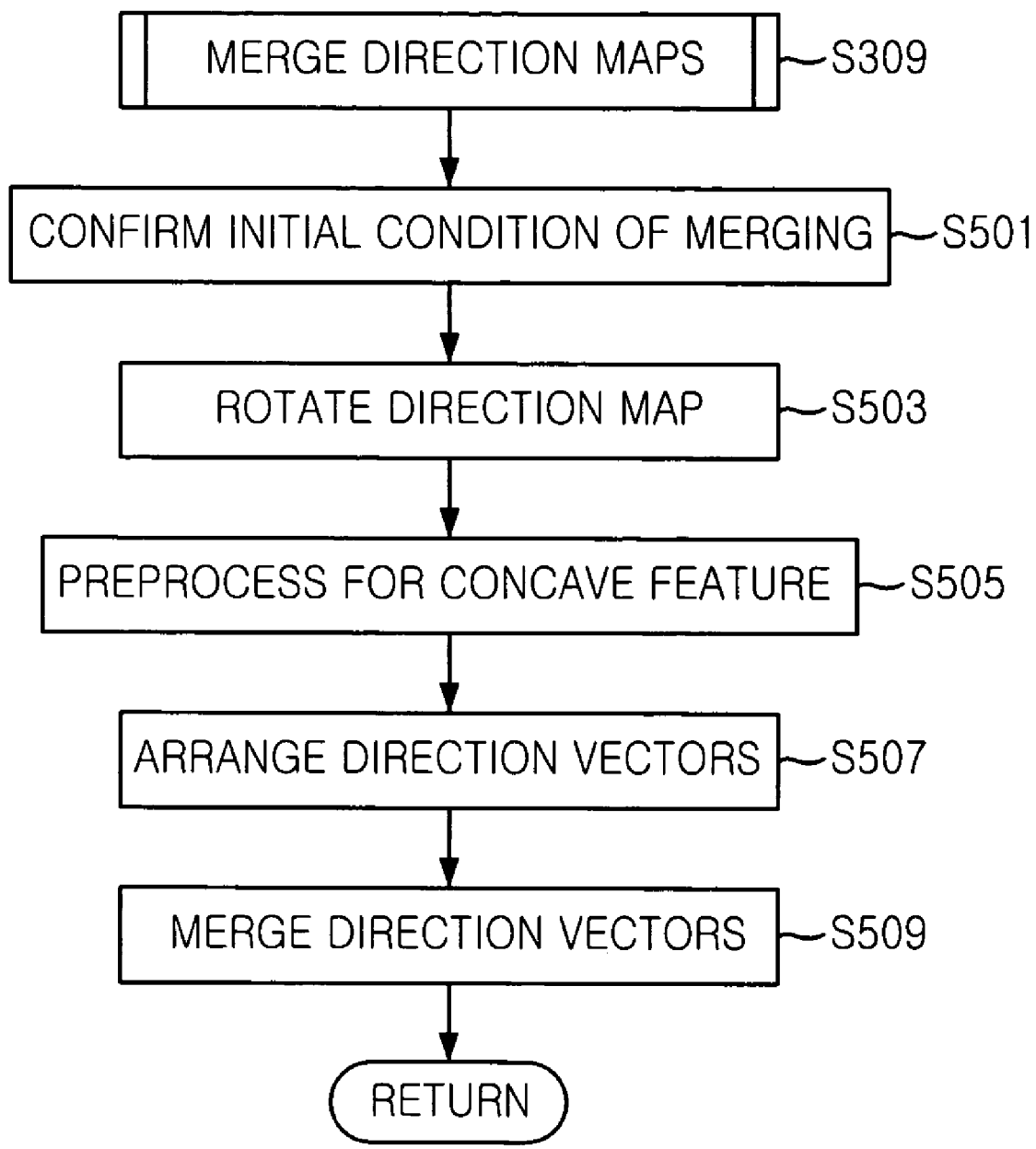

FIG. 7
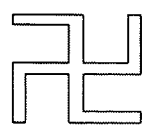
ANGULAR POINT:20
AREA:0.133200
LENGTH:4.560000
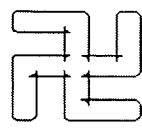
ANGULAR POINT:80
AREA:0.233712
LENGTH:5.035749
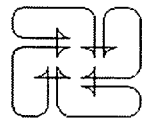
ANGULAR POINT:80
AREA:0.314928
LENGTH:5.511497
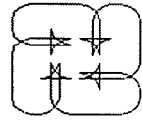
ANGULAR POINT:80
AREA:0.376848
LENGTH:5.987246
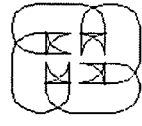
ANGULAR POINT:80
AREA:0.419472
LENGTH:6.462994
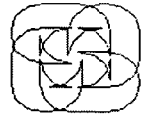
ANGULAR POINT:80
AREA:0.442800
LENGTH:6.938743
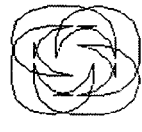
ANGULAR POINT:80
AREA:0.446832
LENGTH:7.414491
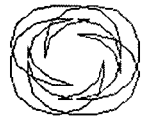
ANGULAR POINT:80
AREA:0.431568
LENGTH:7.890240
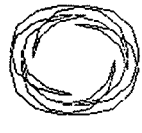
ANGULAR POINT:80
AREA:0.397008
LENGTH:8.365988
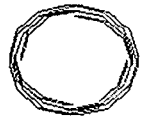
ANGULAR POINT:80
AREA:0.343152
LENGTH:8.841737
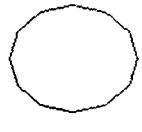
ANGULAR POINT:12
AREA:0.270000
LENGTH:1.863497
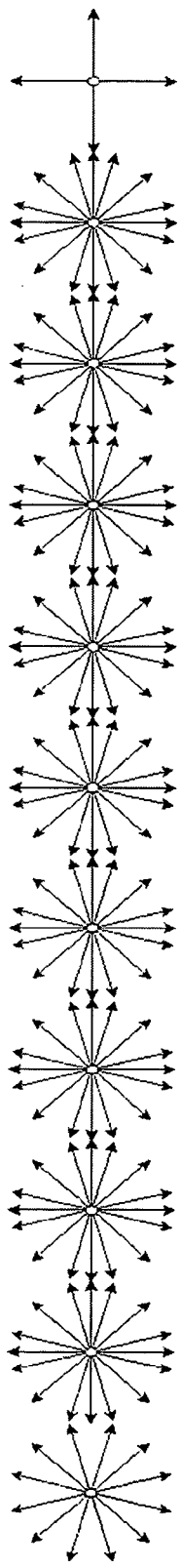
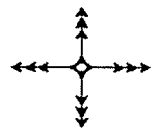
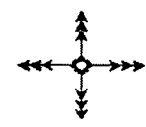
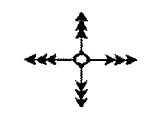
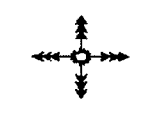

FIG. 8
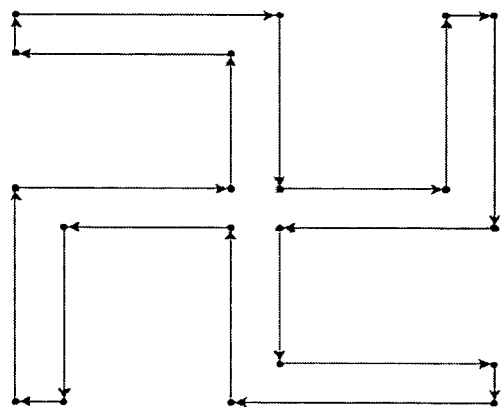
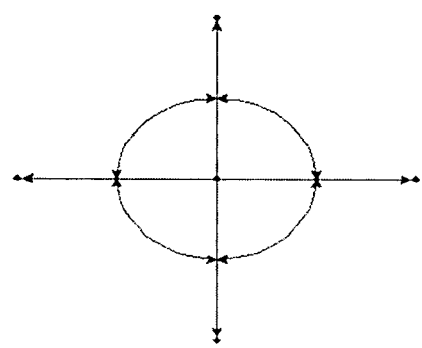
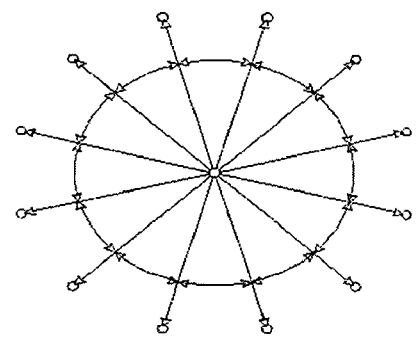
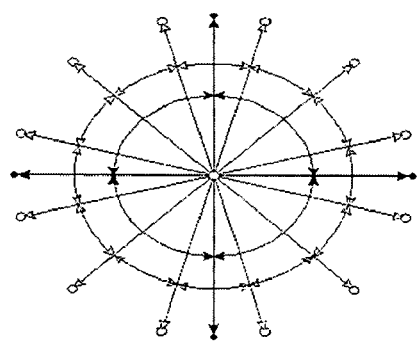
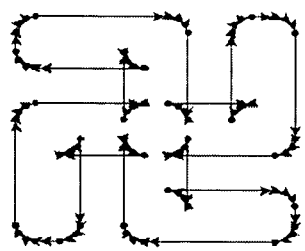
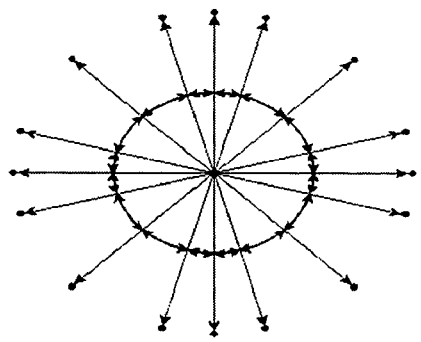

s=1.0 s=0.1

(A)  (B)

METHOD FOR MORPHING GEOMETRIC SHAPES BASED UPON DIRECTION MAP

FIELD OF THE INVENTION

The present invention relates to a method for morphing geometric shapes based upon direction maps; and, more particularly, to a method for morphing geometric shapes by using direction maps to interpolate sides of different geometric shapes and a computer readable recording medium for recording a program that implements the same method.

DESCRIPTION OF THE PRIOR ART

When two geometric shapes are provided, morphing is used to reshape two different geometric shapes into one geometric shape by interpolating sides of two geometric shapes so as to expect special visual effect and to generate a designing path of an operating machine in a computer aided design (CAD) system, a graphic design tool and an animation design tool used in a computer.

However, in prior morphing methods, it is difficult and complicated to derive morphing of geometric shapes because algebra should be used and computation results are not numerically stable.

For overcoming the above-mentioned problem, another conventional morphing method using Minkowski sum is disclosed at Korean Patent application No. 2001-78567 entitled "Morphing method of geometric figures."

In the conventional method using Minkowski sum, the computation is simple and intrinsic by using Minkowski sum. However, in case of generating in-betweens, computation efficiency is degraded and verification of generated shapes is difficult.

SUMMARY OF THE INVENTION

It is, therefore, an object of the present invention to provide a method for morphing geometric shapes by using direction maps so as to interpolate sides of geometric shapes and control geometric morphing speed, and a computer readable recording medium for storing a program that implements the same method.

It is another object of the present invention to provide a method for morphing geometric shapes by using direction maps so as to control and verify directions of line segments, lengths of sides and the number of vertices by using geometric characteristics based on direction maps and smoothly morphing different geometric shapes by adding control shapes during the geometric morphing process, and a computer readable recording medium for storing a program that implements the same method.

In accordance with one aspect of the present invention, there is provided a method for geometric shape morphing by using direction maps so as to smoothly morph more than two different geometric shapes, including the steps of: a) extracting a direction map from each of the geometric shape; b) merging the direction maps in order to generate a merged direction map; c) performing group-based scaling of the merged direction map; and d) generating a polygon by using an inverse function of the merged direction map.

In accordance with another aspect of the present invention, there is provided a computer readable recording medium for reading a program that implements a geometric shape morphing method for morphing at least two different geometric shapes by using direction maps in a morphing apparatus including a microprocessor, including the instructions of: a) extracting a direction map from each of the geometric shape; b) merging the direction maps in order to generate a merged direction map; c) performing group-based scaling of the merged direction map; and d) generating a polygon by using an inverse function of the merged direction map.

BRIEF DESCRIPTION OF THE DRAWINGS

The above and other objects and features of the instant invention will become apparent from the following description of preferred embodiments taken in conjunction with the accompanying drawings, in which:

FIG. 4 is an exemplary diagram showing sequential merging of square and rhombus direction maps in accordance with the present invention;

FIG. 5 is a flow chart showing the direction map merging method of FIG. 3 in accordance with the present invention;

FIG. 7 is an exemplary diagram showing a direction map merging method of control shapes that have concave features in accordance with the present invention;

FIG. 8 is an exemplary diagram showing self-intersections during the merging process of FIG. 7;

DETAILED DESCRIPTION OF THE PREFERRED EMBODIMENTS

Other objects and aspects of the invention will become apparent from the following description of the embodiments with reference to the accompanying drawings, which is set forth hereinafter.

Figure 1:
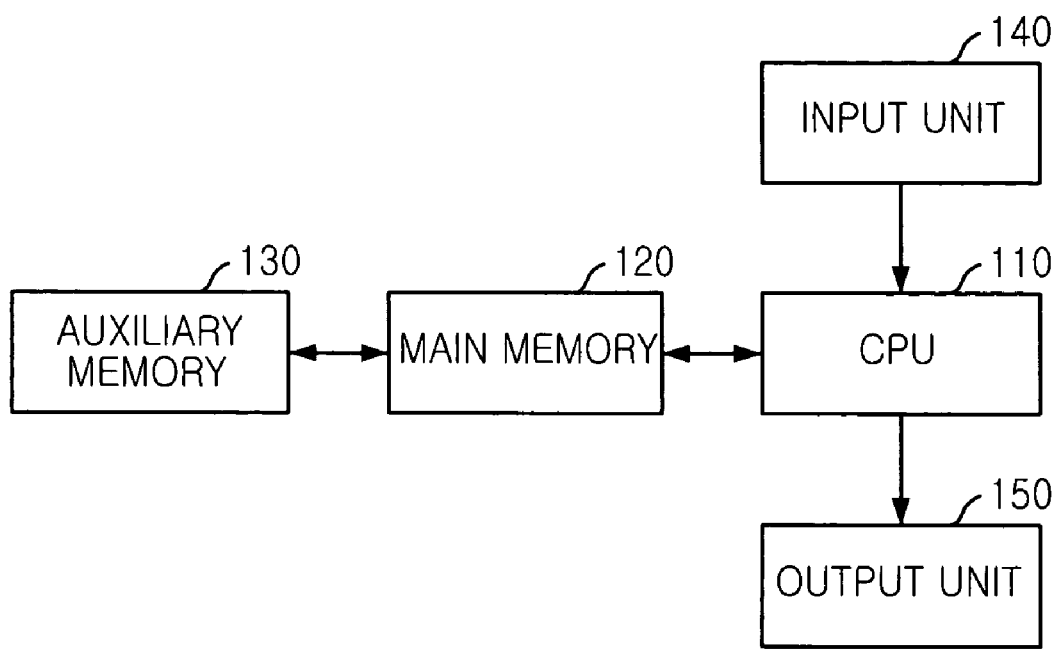
FIG. 1 is a block diagram showing an apparatus for morphing geometric shapes by using direction maps in accordance with the present invention.

FIG. 1 is a block diagram showing an apparatus for morphing geometric shapes by using direction maps in accordance with the present invention.

Referring to FIG. 1, the apparatus for morphing geometric shapes includes a computer processing unit (CPU) 110, a main memory 120, an auxiliary memory 130, an input unit 140, and an output unit 150.

A morphing method in accordance with the present invention is saved in the main memory 120 and the CPU 110 controls the morphing method.

Figure 2:
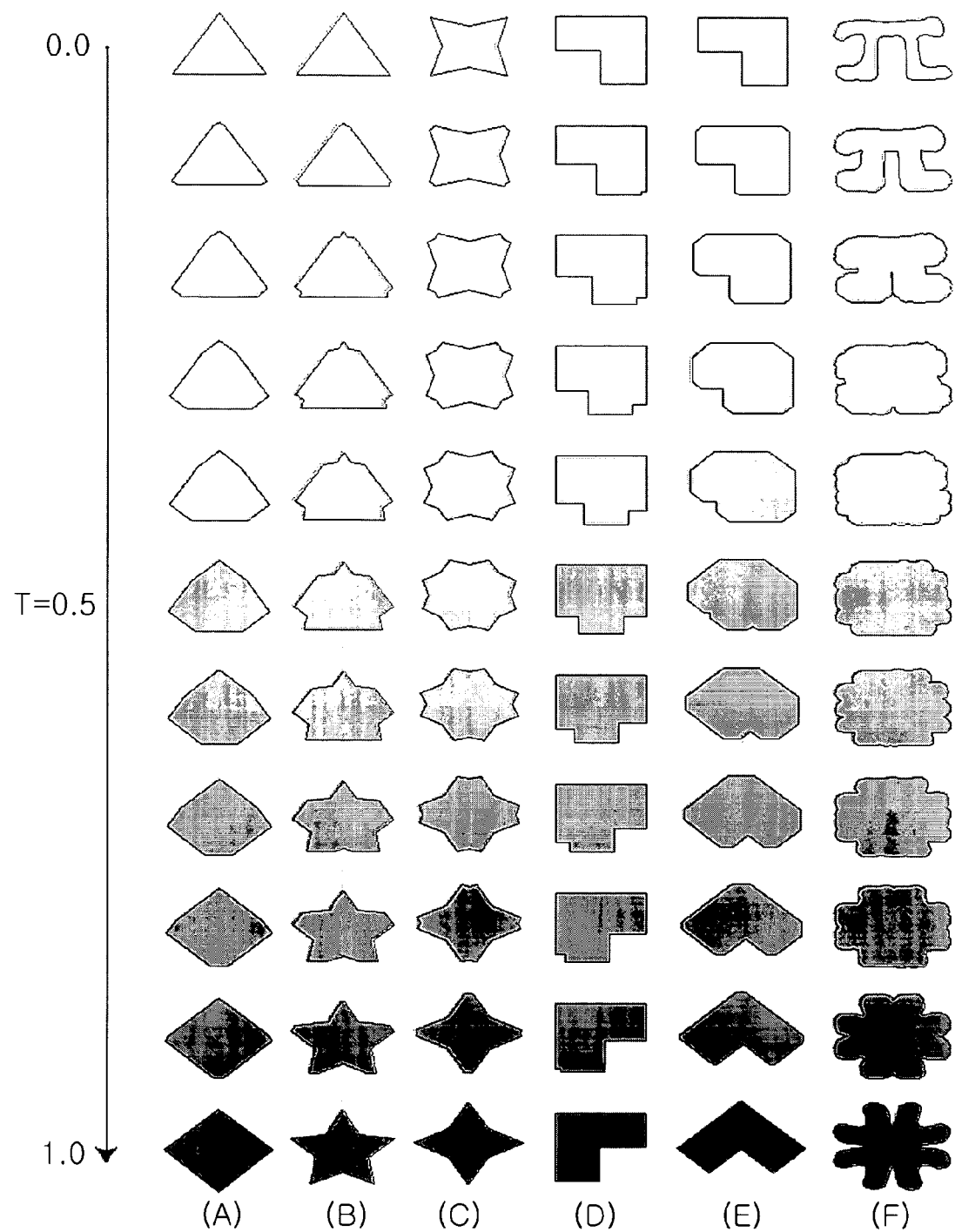
FIG. 2 is exemplary diagrams illustrating morphing progressions of geometric shapes by a morphing method using direction maps in accordance with the present invention.

FIG. 2 is exemplary diagrams showing morphing progressions of geometric shapes by a morphing method using direction maps in accordance with the present invention. Referring to FIG. 2, the geometric shape morphing progresses from top to bottom.

Necessary mathematical definition is explained as follows. Geometric shapes used in the present invention are normalized two-dimensional polygons. The term "normalize" means that self-intersection does not occur and a neighbor line segment is not on the same straight line. Normalized two-dimensional polygons include convex polygons and concave polygons. Geometric shapes provided for morphing are called control shapes or operand shapes. The geometric shapes in normalized two-dimensional shapes are shown in FIG. 2. The i-th vertex of polygon is described as $p_i$. A vertex placed next to $p_i$ is expressed as $p_{i+1}$, in clockwise. Therefore, the orientation of the boundary of geometric shape becomes clockwise.

A geometric shape has an identifier, for example, $A_j$ is described by an identifier j.

Figure 3:
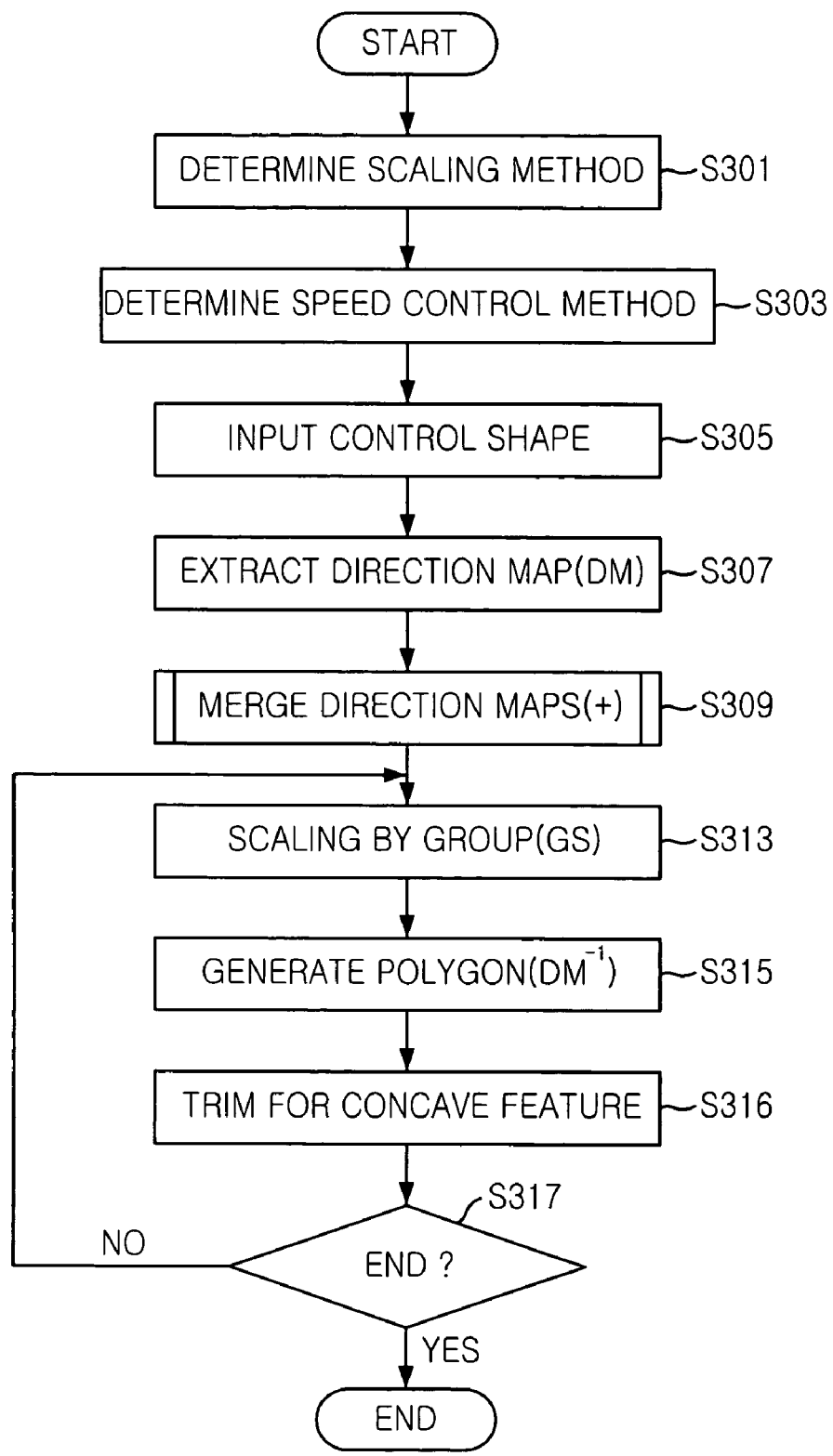
FIG. 3 is a flow chart showing a method for morphing geometric shapes by using direction maps in accordance with the present invention.
Figure 6A:
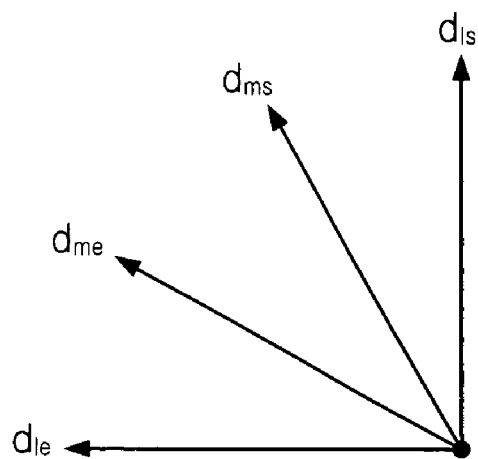
FIGS. 6A to 6D are exemplary diagrams showing the initial conditions of FIG. 5.
Figure 6B:
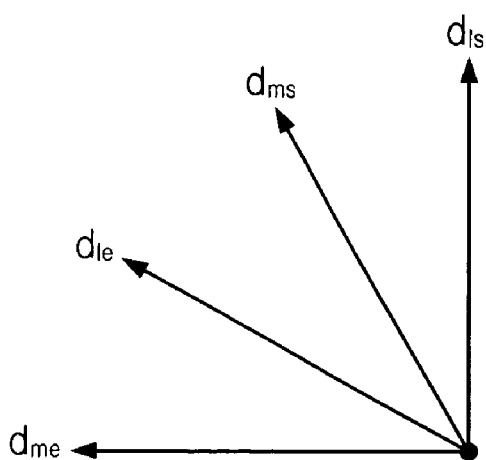
Figure 6C:
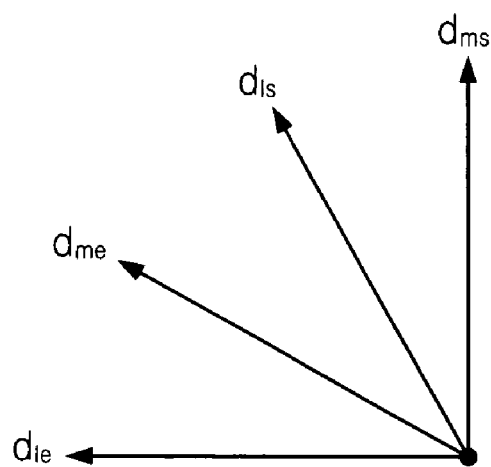
Figure 6D:
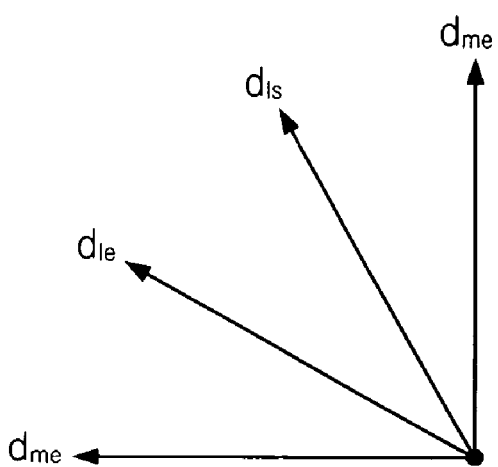

FIG. 3 is a flow chart showing a method for morphing geometric shapes by using direction maps in accordance with the present invention.

Referring to FIG. 3, at steps S301 and S303, methods for controlling size and speed are determined. At step S305, a control shape is inputted. At step S307, a direction map is extracted.

The direction map is the circular list of a direction vector. An i-th direction vector of a direction map is described as $d_i$. Each direction vector has a group identifier. The group identifier of the direction vector is explained in a later part.

A rotating computation R to one direction map is the computation that re-determines a starting vector of the direction vectors. When a direction map D having n numbers of direction vectors has a starting vector as $d_0$, R(D,s) changes the starting vector of D to $d_{(0+s)\%(n+1)}$. Here, % is modulo operation considering a circular list of direction vector.

When subsequently adjacent m+1 numbers of direction vectors, $d_i, \ldots, d_{i+m}$, m>0, are in the same direction, the direction vectors are merged as shown in Eq. 1. New merged direction vectors are $d_{i,i+m}$.

$$d_{i,i+m} = \sum_{j=0}^{m} d_j \quad \text{Eq. 1}$$

The process of merging is called self-merging of direction maps and described as a SM.

If the results of self-merging of two direction maps become identical with each other by performing rotating computation on one direction map, above mentioned two direction maps are the same.

If two vectors have the same directions and are only different in arranging sequences, adding sequences is not important in a self-merging operation.

A normalized direction map means that every direction vector of a direction map has a magnitude of 1. N denotes the operation of normalizing a direction map.

It is possible to map a geometric shape into a direction map in accordance with the present invention. A function for mapping one polygon into a direction map is expressed as DM or a direction map of polygon. At step S307, the direction map is extracted by the DM.

A direction map of one polygon is generated by the direction map extracting function. $DM(A_j)$ is the direction map of polygon $A_j$. The direction vector $d_i$ of adjacent two vertices $p_i$ and $p_{i+1}$ is $(p_i - p_{i+1})$. A group identifier of $d_i$ is set to "j" as an identifier of the geometric shape. Determination of a vertex by Eq. 2 is called generating of a polygon by direction map.

$$p_0 = p_{init}$$

$$p_{i+1} = p_i + d_i \quad \text{Eq. 2}$$

$P_{init}$ is an initial vertex that is additional information of the direction map.

A closed condition must be satisfied with Eq. 2. If the direction map having n+1 number of direction vectors $d_i$ is generating a polygon having n+1 number of vertices $p_0, \ldots, p_n$, the closed condition is described as Eq. 3.

$$p_0 = p_n + d_n \quad \text{Eq. 3}$$

Eq. 3 is satisfied regardless of $P_{init}$. If the closed condition is not satisfied, the direction map is not a direction map of polygon any more.

Although the closed condition is satisfied, generated polygon is not always a normalized polygon. A self-intersection is hardly recognized during the process of generating polygon by the direction map.

If it is assumed that self-intersection does not exist, a normalized polygon is generated easily by not putting adjacent line segments on the same straight line. Therefore, self-merging is required in order to generate a normalized polygon.

If only one vertex $P_{i+m+1}$ is generated as shown in Eq. 4 instead of generating m+1 numbers of vertices, a normalized polygon is generated.

$$p_{i+m+1} = p_i + \sum_{j=0}^{m} d_j \quad \text{Eq. 4}$$

The last condition to generate a polygon based on direction maps is related to the directions of sides of the generated polygon. If the directions of sides of the generated polygon are in counter-clockwise, a sequence of direction vectors of a direction map can be changed or a sequence of vertices can be changed. If there is no mention on the directions of sides, it is assumed that the condition of direction is satisfied without any difficulty.

The direction map can be mapped into the geometric shape by using the method for generating a polygon based upon a direction map. The mapping into the geometric shape is defined as the inverse function of the function for extracting a direction map, which is called an inverse function of direction map. The inverse function of direction map is expressed as $DM^{-1}(D)$.

When the closed condition is satisfied in generating a polygon, the inverse function can be defined.

If an arbitrary direction map D has an inverse function $DM^{-1}(D)$, the direction map D is the direction map of polygon A. The direction map of A is identical to D as shown in Eq. 5.

$$DM^{-1}(D) = A$$

$$DM(A) = DM(DM^{-1}(D)) = D \quad \text{Eq. 5}$$

A circular list of direction map that shows the direction map of a convex polygon is arranged based upon Eq. 6 by the vector product of adjacent vectors.

$$d_i \times d_{i+1} = x_i y_{i+1} - y_i x_{i+1} \leq 0 \quad \text{Eq. 6}$$

Referring to Eq. 6, $x_i$ and $y_i$ are coordinates of the vector $d_i$ and equality exists in case that two direction vectors are on the same straight line. Equality can be occurred when direction maps are merged and an arranging sequence of direction vectors is not important when the direction vectors are on the same straight line.

When direction vectors are arranged by inequalities, it is call the condition of strong convex arrangement. When direction vectors are arranged by inequalities and equalities, it is called the condition of weak convex arrangement.

$d_i \times d_{i+1} \leq 0$ shows that the relation between adjacent vectors is convex. $d_i \times d_{i+1} \geq 0$ shows that the relation between adjacent vectors is concave.

At step S309, the extracted direction maps are merged.

A merge operation is marked as +. Two direction maps are merged into one direction map satisfying the condition of proper arrangement. The merged vectors are re-arranged based upon the conditions of convex arrangement and concave arrangement.

The method for merging direction maps is explained as following.

The condition of convex/concave arrangement is defined to have the same result of convolution operation. The morphing result of geometric shapes based upon direction maps using the condition of arranging is same as the result of Minkowski sum when it is considered that the boundary of the result of Minkowski sum is a subset of the convolution operation.

A direction map of $A_j$ is $DM(A_j)=D_j$ and a direction map of $A_k$ is $DM(A_k)=D_k$. The merging operation is shown in Eq. 7.

$$DM(A_j)+DM(A_k)=D_j+D_k \quad \text{Eq. 7}$$

The merged direction map keeps the previous group identifier. The result of merging operation is the same regardless of the sequence of operands.

If $A_j$ and $A_k$ are convex, the direction vectors should be re-arranged to meet the condition of convex arrangement. For example, when $d_m$ and $d_l$ are direction vectors of $D_m$ and $D_l$, and $d_m$ is rearranged to be place between $d_l$ and $d_{l+1}$ which are not in the same direction, a case that arrangement of the direction vectors meets the condition of convex arrangement is described as:

$$d_l \times d_{l+1} = x_l y_{l+1} - y_l x_{l+1} \leq 0$$

$$d_l \times d_m = x_l y_m - y_l x_m \leq 0$$

$$d_m \times d_{l+1} = x_m y_{l+1} - y_m x_{l+1} \leq 0 \quad \text{Eq. 8}$$

If Eq. 8 is satisfied, a relation to $d_{m+1}$ is figured. In a case that $d_m$ is placed not between $d_l$ and $d_{l+1}$ but outside of the clockwise direction, an equation is expressed as:

$$d_l \times d_m = x_l y_m - y_l x_m > 0$$

$$d_m \times d_{l+1} = x_m y_{l+1} - y_m x_{l+1} > 0 \quad \text{Eq. 9}$$

The condition of convex arrangement is obtained by figuring out the relations of $d_m$, $d_l$, and $d_{l+1}$. If these procedures are subsequently applied, the direction vectors of two direction maps are merged and the condition of convex arrangement is satisfied.

FIG. 4 is an exemplary diagram showing that sequential merging of square and rhombus direction maps in accordance with the present invention.

FIG. 5 is a flow chart showing the direction map merging method of FIG. 3 in accordance with the present invention.

At step 501, an initial condition of merging is confirmed.

FIGS. 6A to 6D are exemplary diagrams showing the initial conditions of FIG. 5.

$d_{ls}$ and $d_{ms}$ are starting direction vectors of $D_j$ and $D_k$. $d_{le}$ and $d_{me}$ are ending direction vectors of $D_j$ and $D_k$.

At step S503, direction maps are rotated to be one of the four cases of FIGS. 6A to 6D.

When two operands for merging operation are concave polygons, computation becomes very complicated, and this is not adequate for the efficiency of computation and the quality of result. At step S505, a preprocess for developing a concave feature is executed.

A control shape is decomposed into convex subsets for morphing, and results are composed in case that the definition of convolution operation is satisfied. The method of decomposition and composition for concave feature is a typical process for geometric shape.

A convex hull is used in case that the definition of convolution operation is not satisfied. A direction map is extracted from the convex hull of a control shape. A polygon is generated based upon a merged direction map, and replaces the previous concave part with the concave feature.

The method of replacing a convex hull for obtaining the concave feature has an advantage that interference between the concave features does not happen, and it does not need to remove self-intersection and mutual-intersection.

At step S507, if two direction maps generate only convex polygons, the direction vector can be arranged based upon Eqs. 8 and 9.

A merging operation having operand which generates a concave polygon is more complicated than the merging operation having operand which generates a convex polygon.

For example, when $D_j$ is a direction map that generates a concave polygon and $D_k$ is a direction map that generates a convex polygon, arrangement condition for merging direction vectors becomes different and Eq. 8 is replaced with Eq. 10.

$$d_l \times d_{l+1} = x_l y_{l+1} - y_l x_{l+1} > 0$$

$$d_l \times d_m = x_l y_m - y_l x_m \geq 0$$

$$d_m \times d_{l+1} = x_m y_{l+1} - y_m x_{l+1} \geq 0 \quad \text{Eq. 10}$$

If Eq. 10 is satisfied, a relation to $d_{m-1}$ is figured. In case that $d_m$ is placed not between $d_l$ and $d_{l+1}$ but outside of the clockwise direction, Eq. 11 is used.

$$d_l \times d_m = x_l y_m - y_l x_m < 0$$

$$d_m \times d_{l+1} x_m y_{l+1} - y_m x_{l+1} < 0 \quad \text{Eq. 11}$$

$d_m$ is proceeding in forward direction on the convex part of a polygon $A_l$ and proceeding in opposite direction on the concave part of the polygon $A_l$.

At step S509, a normalized polygon is generated.

At step S313 of FIG. 3, the normalized polygon is scaled by the group. The direction vector of the direction map keeps the group identifier. Direction vectors of the direction map are scaled by the group using a group identifier. A vector scaling operation is a method of multiplying a scalar and a vector. A scaling by group is a method of multiplying scalars of group and direction vector.

The group-based scaling operation is described as "GS" and needs two factors.

One is a direction map and the other is a scalar function (t) for scaling. The scaling function $S_m(t)$ has a group identifier m as shown in Eq. 12.

$$GS(D_{lm},(S_l(t),S_m(t))),$$

$$S_l(t)=1-t,$$

$$S_m(t)=t.$$ 
Eq. 12

(1−t) is multiplied by l group and t is multiplied by m group to obtain result $D_{lm}$ by merging $D_l$ and $D_m$. The scaling method is called a linear interpolation of a geometric shape. Various interpolation methods can be supposed according to relations of $S_l(t)$.

When N numbers of in-betweens are generated, a list of scalar functions for scaling an n-th in-between is shown in Eq. 13.

$$(S_l(t), S_m(t)) = (1-t, t) = (1-t(n), t(n))$$ 
Eq. 13

$$t(n) = \frac{n}{N+1}, (0 < n < N+1)$$

Morphing speed can be controlled by changing the relation of scalar functions as shown in Eq. 14.

$$(S_l(t), S_m(t)) = \frac{1}{s(1-t)+t}(s(1-t), t)$$ 
Eq. 14

$$= \frac{1}{s(1-t)+t}(s(1-t(n)), t(n))$$

$$t(n) = \frac{n}{N+1}, (0 < n < N+1)$$

Figure 10A:
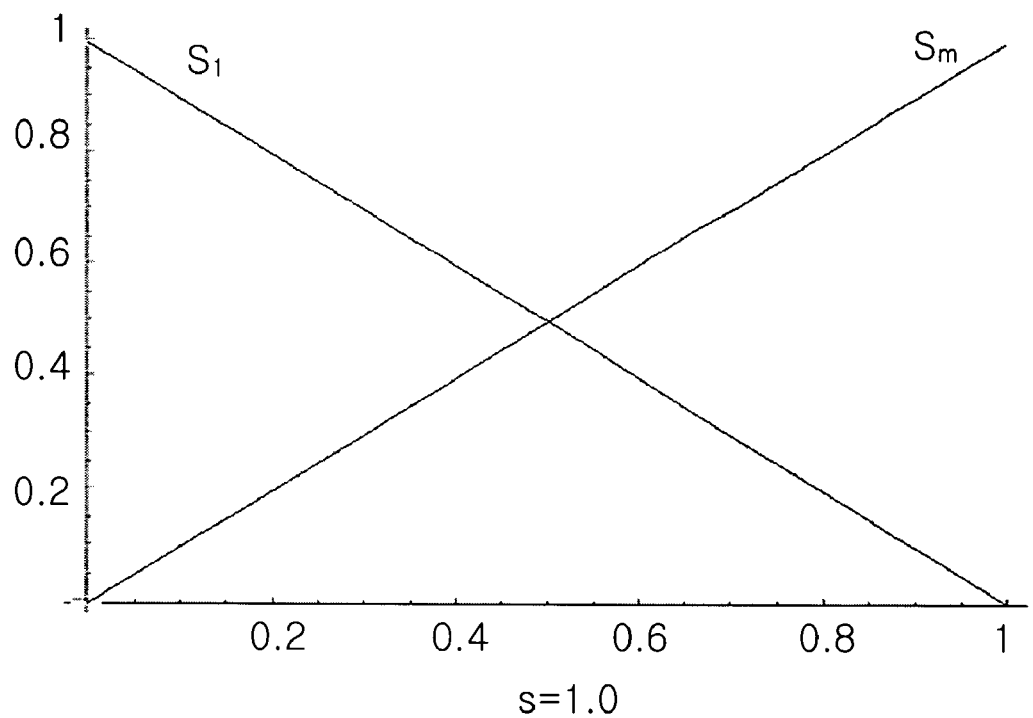
FIGS. 10A to 10C are graphs illustrating a method of controlling morphing speed in accordance with the present invention.
Figure 10B:
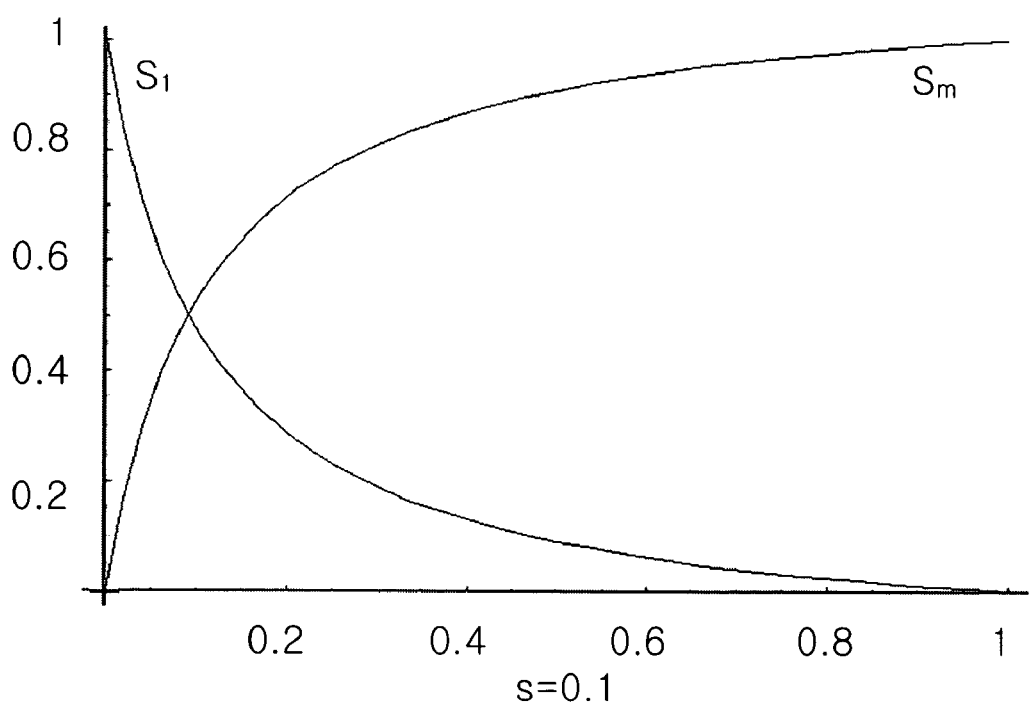
Figure 10C:
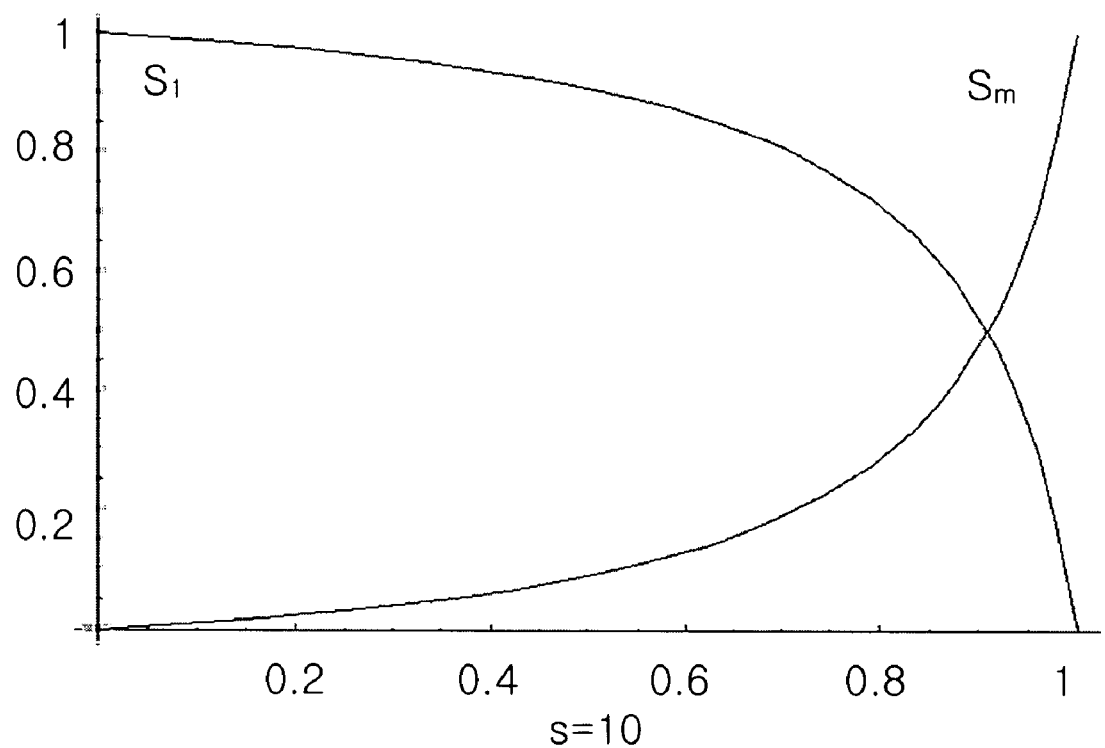

FIGS. 10A to 10C are graphs illustrating a method of controlling morphing speed in accordance with the present invention.

FIG. 10A is showing a convergence speed when S is 1. If S is smaller than 1, the convergence speed toward $A_m$ becomes fast as shown in FIG. 10B. If S is larger than 1, the convergence speed toward $A_l$ becomes fast as shown in FIG. 10C.

Figure 11:
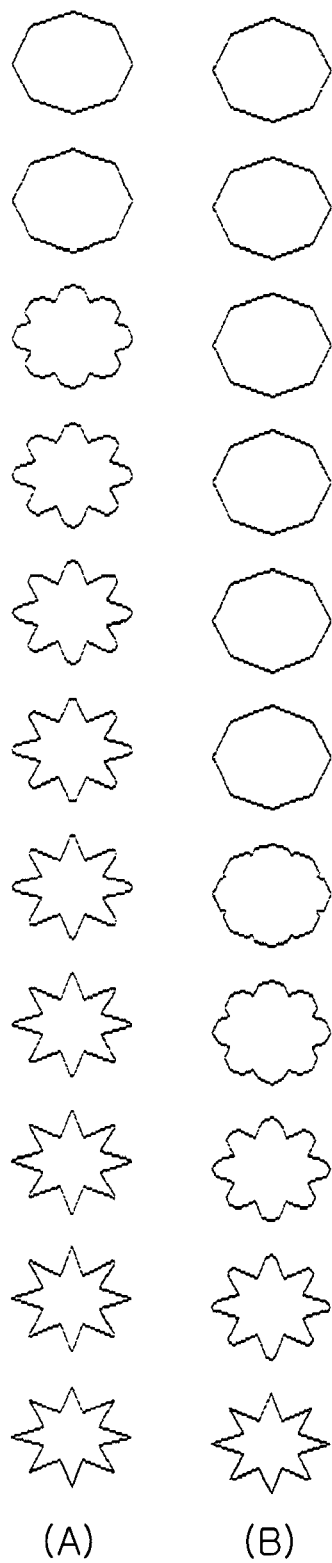
FIG. 11 is exemplary diagrams showing geometric shapes generated by the method of controlling morphing speed in accordance with the present invention.

FIG. 11 is an exemplary diagram showing geometric shapes generated by the method of controlling morphing speed in accordance with the present invention.

At step S315 in FIG. 3, a polygon is generated by using a merged direction map. The method for generating a polygon is the same as the typical method for generating a polygon from a direction map.

At step S316, a normalized polygon is trimmed for concave feature.

FIG. 7 is an exemplary diagram showing a method of merging direction maps for obtaining control shapes that have concave features in accordance with the present invention.

FIG. 8 is an exemplary diagram showing self-intersections during the merging process of FIG. 7.

Figure 9:
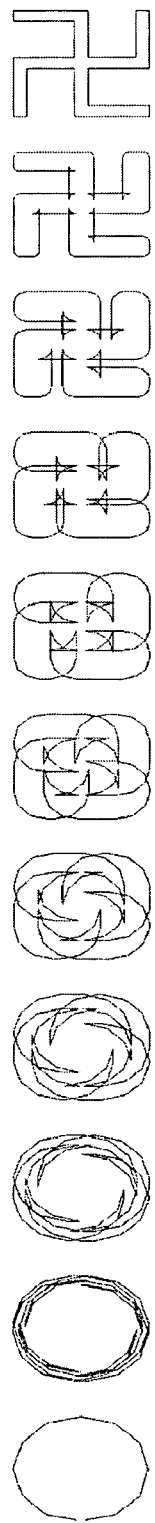
FIG. 9 is an exemplary diagram showing a process of removing the self-intersections of FIG. 8.

FIG. 9 is an exemplary diagram showing a process of removing the self-intersections of FIG. 8.

As shown in FIGS. 7 to 9, if a control shape that has a concave feature, a normalized polygon is not generated by generating a polygon from a merged direction map.

Although self-intersections exist in a generated geometric shape as shown in FIG. 7, a normalized polygon is obtained by applying a trimming operation. When self-intersections need to be removed, a trimming operation can be used to obtain a concave feature.

In sum, the method of morphing geometric shapes by using direction maps in accordance with the present invention is explained briefly as follows.

First, determine the number of in-betweens, scaling method and speed control method.

Second, extract a direction map.

Third, merge two direction maps $$\overline{D}=D_l+D_m=DM(A_l)+DM(A_m)$$ 
Eq. 15

Forth, scale by the group.

In case of a linear interpolation, Eq. 16 is applied.

$$D(t)=GS(\overline{D},(Sl(t),Sm(t)))=GS(\overline{D},1-t,t)$$ 
Eq. 16

Fifth, generate a polygon from the direction map. Eq. 17 is used.

$$A(t)=DM^{-1}(D(t))$$ 
Eq. 17

Sixth, change the scaling factor and repeat the process to generate the predetermined numbers of in-betweens.

The present invention is more efficient than the method of Minkowski sum. The method of Minkowski sum is explained to be compared to the present invention.

The boundary line of a result made by computing Minkowski sum can be same as that of the present invention. The linear interpolation of geometric shape obtained by computing Minkowski sum can be expressed as Eq. 18.

$$(1-t)A_0 \oplus tA_1 = DM^{-1}(GS((DM(A_0)+DM(A_1)),(1-t,t)))$$ 
Eq. 18
$$= DM^{-1}(GS(D_0)+D_1,(1-t,t)))$$
$$= DM^{-1}(GS(D,(1-t,t)))$$
$$= DM^{-1}(\overline{D(t)})$$
$$= A(t)$$

The prior interpolation method scales geometric shapes by t times and (1−t) times and execute Minkowski sum. Although internal processes are the same, the same processes are repeated by t times.

If N numbers of in-betweens are generated, 2N times of scaling and N times of Minkowski sum are executed. However, the morphing method using direction maps in accordance with the present invention executes merging operation once and scaling by group is executed by N times.

If N numbers of in-betweens are generated, 2N times of scaling and one time of merging operation are executed in accordance with the present invention.

Therefore, the linear interpolation of the present invention is faster and more efficient than that of the Minkowski method.

When the geometric shape morphing method using direction maps in accordance with the present invention is used, normalized direction maps of generated in-betweens are the same as shown in Eq. 19.

$$N(DM(A(t))) = N(DM(DM^{-1}(DA(t))))$$ 
Eq. 19
$$= N(D(t))$$
$$= N(\overline{D})$$

The normalized direction map of D that merges direction maps of control shapes is the same as that of any in-between. Characteristics of in-betweens that were generated by geometric shape morphing are determined by the length of a line segment. The relation can be used to verify in-betweens. The method is called "The verification method based on a normalized direction map."

The number of line segments is constant in the geometric shape morphing method by using direction maps in accordance with the present invention. When the numbers of vertices of control shapes $A_l$ and $A_m$ are $N_l$ and $N_m$, and the number of line segments that have the same direction is $N_c$, the number of vertices of the generated polygon is $N_{lm}$ as shown in Eq. 20.

$$N_{lm} = N_l + N_m - N_c \qquad \text{Eq. 20}$$

The number of vertices can be used for the verification of morphing in-betweens. The method is called "the verification method based upon the number of vertices".

The length of boundary of a generated in-between can be interpolated by the geometric shape morphing method using direction maps in accordance with the present invention.

When the boundary lengths of control shapes $A_l$ and $A_m$ are $L_l$ and $L_m$, $L_l$ and $L_m$ are interpolated by the boundary lengths $L_{lm}$ of the generated polygon $A_{lm}$ by merging two control shapes. The method of linear interpolation is shown in Eq. 21.

$$A_{lm} = DM^{-1}(GS((DM(A_l) + DM(A_m)), (1-t, t))),$$

$$L_{lm} = (1-t)L_l + tL_m \qquad \text{Eq. 21}$$

The above mentioned method is called "The verification method base upon the length of boundary."

When the control shape has a concave feature, the verification methods base upon normalized direction map, the number of vertices, and the length of boundary are applied to the convex hull. The geometric shape morphing method in accordance with the present invention can be used in geometric shape morphing with more than two control shapes. An M-th order Bezier control can be used by using a scalar function for scaling an M-th order Bernstein polynomial to (M+1) number of control shapes $A_i(0 \leq i \leq M)$ as shown in Eq. 22.

$$A(t) = DM^{-1}\left(SG\left(\underline{D}, \left(B_0^M, \cdots, B_M^M(t)\right)\right)\right) \qquad \text{Eq. 22}$$

$$\underline{D} = \sum_{i=0}^{M} DM(A_i) = \sum_{i=0}^{m} D_i,$$

$$B_i^M(t) = \binom{M}{i} t^i (1-t)^{M-i}$$

Eq. 22 is also called an M-th Bezier control of geometric shape morphing by using direction maps. More than two direction maps are merged subsequently as shown in Eq. 23.

$$\overline{D} = (\ldots(((D_0 + D_1) + D_2) + D_3) \ldots) + D_M \qquad \text{Eq. 23}$$

Figure 12:
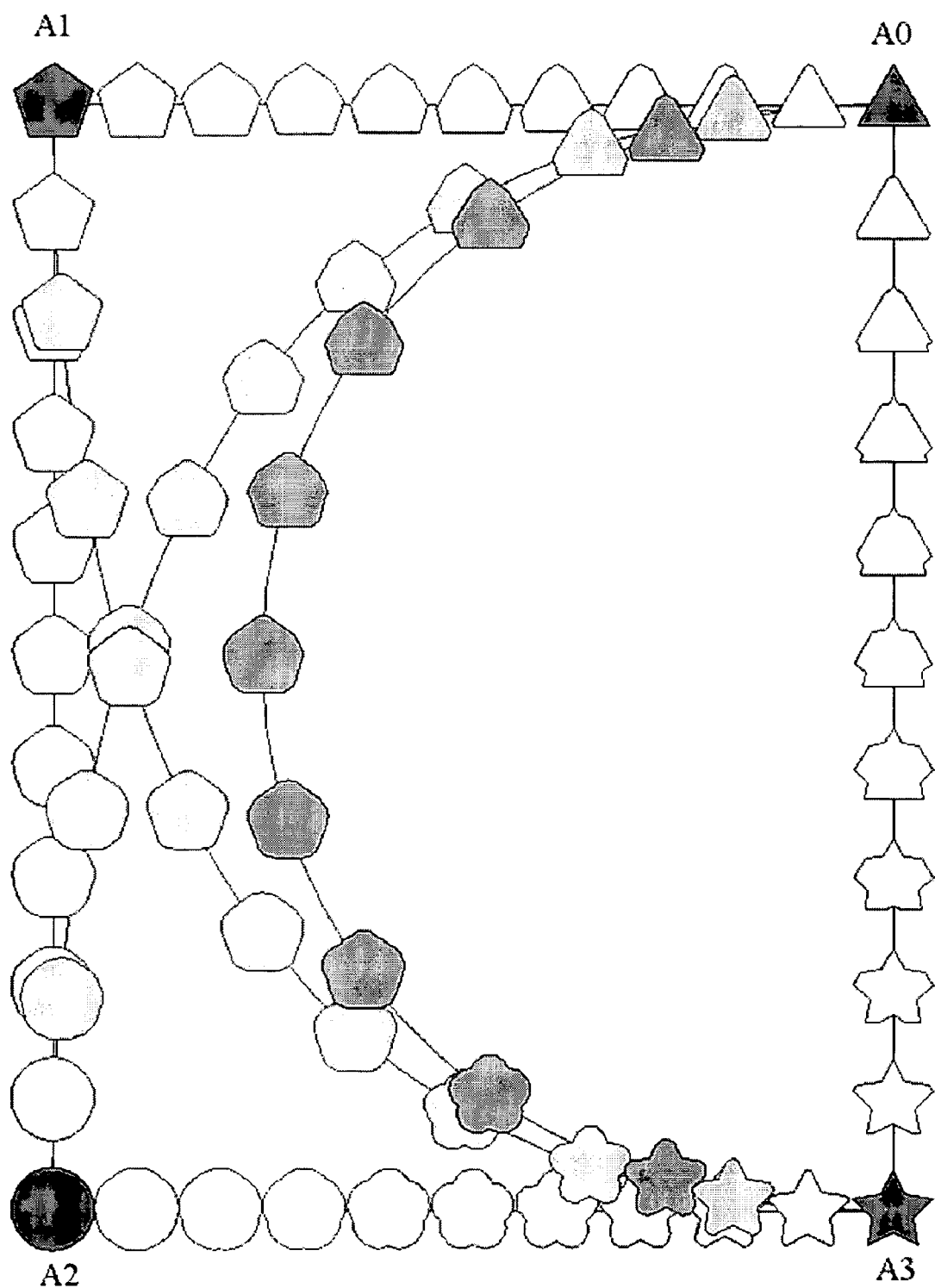
FIG. 12 is an exemplary diagram showing a method of generating in-betweens of four control shapes by applying $3^{rd}$ order Bezier control.

FIG. 12 is an exemplary diagram showing the generation of in-betweens of four control shapes by applying a $3^{rd}$ order Bezier control method.

A generalized method of a Bezier control is a Blossom control. Independent M numbers of parameters $t_i(0 \leq i \leq M)$ are used in the Blossom control.

For example, a $3^{rd}$ order Blossom $A_0^3[t_1, t_2, t_3]$ is described as Eq. 24.

$$A_0^3[t_1, t_2, t_3] = (1-t_1)(1-t_2)(1-t_3)A_0 + \qquad \text{Eq. 24}$$
$$(t_1(1-t_2)(1-t_3) + t_2(1-t_1)(1-t_3) + t_3(1-t_1)(1-t_2))A_1 +$$
$$(t_1 t_2(1-t_3) + t_1 t_3(1-t_2) + t_2 t_3(1-t_1))A_2 + t_1 t_2 t_3 A_3$$

Eq. 24 can be simplified to Eq. 26 by using Eq. 25, a $3^{rd}$ order base function $B_i^3(t_1, t_2, t_3)$ of Blossom.

$$B_0^3(t_1, t_2, t_3) = (1-t_1)(1-t_2)(1-t_3)$$

$$B_1^3(t_1, t_2, t_3) = t_1(1-t_2)(1-t_3) + t_2(1-t_1)(1-t_3) + t_3(1-t_1)(1-t_2)$$

$$B_2^3(t_1, t_2, t_3) = t_1 t_2(1-t_3) + t_1 t_3(1-t_2) + t_2 t_3(1-t_1)$$

$$B_3^3(t_1, t_2, t_3) = t_1 t_2 t_3 \qquad \text{Eq. 25}$$

$$A_0^3[t_1, t_2, t_3] = B_0^M(t_1, t_2, t_3)A_0 + B_1^M(t_1, t_2, t_3)A_1 + B_2^M(t_1, t_2, t_3)A_2 + B_3^M(t_1, t_2, t_3)A_3 \qquad \text{Eq. 26}$$

Eq. 26 can be described as Eq. 27.

$$A(t_1, t_2, t_3) = A_0^3[t_1, t_2, t_3] \qquad \text{Eq. 27}$$
$$= DM^{-1}(SG(\overline{D}, (B_0^3(t_1, t_2, t_3), \cdots, B_3^3(t_1, t_2, t_3))))$$

A base function of Blossom is used as a scalar function for scaling in the Blossom control method of geometric shape which uses a direction map.

An i-th base function of an M-th order Blossom is described as Eq. 28.

$$B_i^M(t_1, t_2, \cdots, t_M) = \sum_{T_1, T_2} \left( \prod_{j \in T_1} t_j \prod_{k \in T_2} (1-t_k) \right) \qquad \text{Eq. 28}$$

$$|T_1| = i,\ T_1 \cap T_1 = \emptyset,\ T_1 \cup T_1 = \{1, 2, \cdots, M\}$$

The M-th order Blossom control method of geometric shape which uses a direction map can be described by using a base function of an M-th order blossom as a scalar function for scaling as shown in Eq. 29.

$$A(t_1, t_2, \ldots, t_M) = A_0^M[t_1, t_2, \ldots, t_M] \qquad \text{Eq. 29}$$
$$= DM^{-1}(SG(\overline{D}, (B_0^M(t_1, t_2, \ldots, t_M), \ldots, B_M^M(t_1, t_2, \ldots, t_M))))$$

If all the parameters of an M-th order have the same value, $t_i = t(1 \leq i \leq M)$, an M-th order Bernstein polynomial is derived as shown in Eq. 30.

$$B_i^M(t_1, t_2, \ldots, t_M) = \sum_{T_1, T_2} \left( \prod_{j \in T_1} t \prod_{k \in T_2} (1-t) \right) \qquad \text{Eq. 30}$$
$$= \sum_{T_1, T_2} t^{|T_1|}(1-t)^{|T_2|}$$

-continued $$= \binom{|T_1|+|T_2|}{|T_1|} t^{|T_1|}(1-t)^{|T_2|}$$

$$= \binom{M}{i} t^i (1-t)^{M-i} = B_i^M(t)$$

An M-th order Bezier control is a special case of an M-th order Blossom control as shown in Eq. 30.

Figure 13:
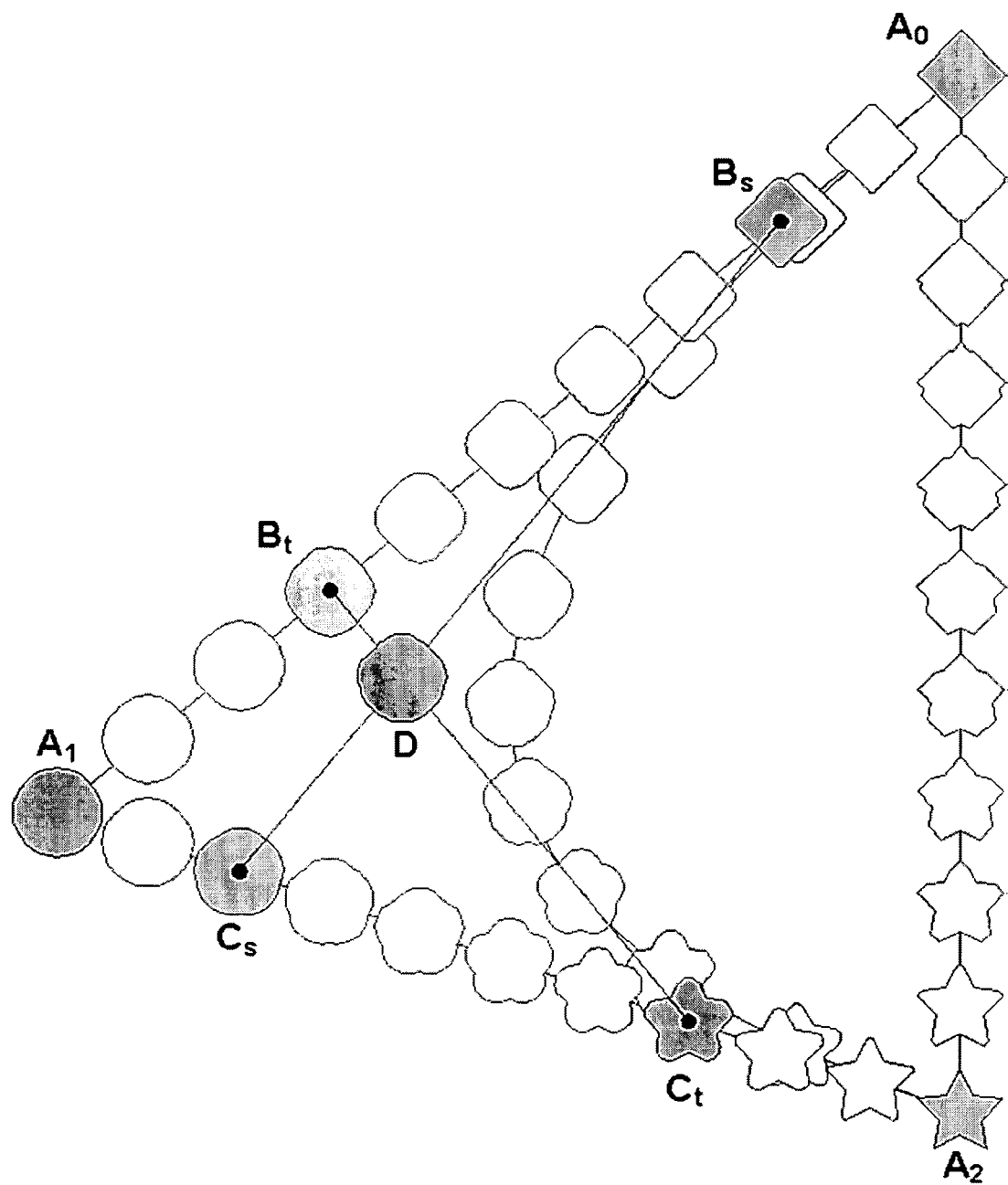
FIG. 13 is an exemplary diagram showing a method of generating in-betweens by $2^{nd}$ order Blossom control of three control shapes in accordance with the present invention.

FIG. 13 is an exemplary diagram showing the generation of in-betweens by a $2^{nd}$ order Blossom control of three control shapes in accordance with the present invention.

The method of the present invention can be saved in computer readable medium, e.g., a CD-ROM, a RAM, a ROM, a floppy disk, a hard disk, and an optical/magnetic disk.

As mentioned above, the present invention can smoothly morph different geometric shapes by extracting direction maps of the different geometric shapes, merging the direction maps, applying group-based size control and generating a polygon by using inverse function of the direction map.

Also, the present invention can control and verify directions of lines, lengths of boundary lines and the number of vertices by interpolating concave features of boundary lines, controlling the morphing speed and using Bezier or Blossom control method to obtain the control shape.

Again, the present invention can provide fast and stable morphing of geometric shapes while controlling size of in-betweens and speed of geometric shape morphing by not using algebraic characteristics and overcoming inefficiency of Minkowski sum computation.

Although the invention has been shown and described with respect to the preferred embodiments, it will be understood by those skilled in the art that various changes and modifications may be made without departing from the spirit and scope of the invention as defined in the following claims.

What is claimed is:

1. A method for morphing geometric shapes by using a direction map in order to smoothly morph more than two different geometric shapes, comprising the steps of:
   a) extracting a direction map from each of the geometric shapes;
   b1) rotating the direction maps according to an initial condition of merging;
   b2) arranging direction vectors;
   b3) merging the direction vectors to generate a merged direction map;
   c) performing group-based scaling of the merged direction map; and
   d) generating a polygon by using an inverse function of the merged direction map.

2. The method as recited in claim 1, further comprising the step of:
   e) determining the number of in-betweens to be generated, and determining a group-based scaling method and a speed controlling method according to the number of in-betweens.

3. The method as recited in claim 1, further comprising the step of:
   f) repeating said step c) and said step d) by changing a scaling factor.

4. The method as recited in claim 1, wherein the direction map is defined as a circular list of direction vectors and arranged based on an equation as:

$$d_i \times d_{i+1} = x_i y_{i+1} - y_i x_{i+1} \leq 0,$$

wherein $d_i$ is an $i^{th}$ direction vector and $x_i$ and $y_i$ are coordinates of $d_i$.

5. The method as recited in claim 1, wherein if merged direction maps generates concave polygons, control shapes are decomposed into convex subsets and said steps b2) and b3) are executed.

6. The method as recited in claim 1, wherein if merged direction maps generates concave polygons, direction maps for convex hulls of control shapes are generated and said steps b2) to b3) are executed.

7. The method as recited in claim 1, wherein if merged direction maps are generating convex polygons, the direction maps are arranged to satisfy equations as:

$$d_l \times d_{l+1} = x_l y_{l+1} - y_l x_{l+1} \leq 0$$

$$d_l \times d_m = x_l y_m - y_l x_m \leq 0$$

$$d_m \times d_{l+1} = x_m y_{l+1} - y_m x_{l+1} \leq 0$$

$$d_l \times d_m = x_l y_m - y_l x_m > 0$$

$$d_m \times d_{l+1} = x_m y_{l+1} - y_m x_{l+1} > 0,$$

wherein an $i^{th}$ direction vector of the direction map is described as $d_i$.

8. The method as recited in claim 1, wherein if every merged direction map does not generate a convex polygon, the direction maps are arranged to satisfy equations as:

$$d_l \times d_{l+1} = x_l y_{l+1} - y_l x_{l+1} > 0$$

$$d_l \times d_m = x_l y_m - y_l x_m \geq 0$$

$$d_m \times d_{l+1} = x_m y_{l+1} - y_m x_{l+1} \geq 0$$

$$d_l \times d_m = x_l y_m - y_l x_m < 0$$

$$d_m \times d_{l+1} = x_m y_{l+1} - y_m x_{l+1} < 0,$$

wherein an $i^{th}$ direction vector of the direction map is described as $d_i$.

9. The method as recited in claim 1, wherein scaling of step (c) is interpolated by an equation as:

$$GS(D_{lm},(S_l(t),S_m(t))),$$

$$S_l(t)=1-t,$$

$$S_m(t)=t,$$

wherein $S_i(t)$ is a list of scalar functions used for group-based scaling and D describes a direction map.

10. The method as recited in claim 9, wherein when N numbers of in-betweens are generated at a linear speed, the list of scalar functions expressed as below equations is used, herein the equations are:

$$(S_l(t),S_m(t))=(1-t,t)=(1-t(n),t(n))$$

$$t(n) = \frac{n}{N+1}, (0 < n < N+1).$$

11. The method as recited in claim 9, wherein when a speed of convergence is increased toward a control shape, the list of scalar functions expressed as below equations is used, herein the equations are:

$$(S_l(t), S_m(t)) = \frac{1}{s(1-t)+t}(s(1-t), t)$$

$$= \frac{1}{s(1-t)+t}(s(1-t(n)), t(n))$$

$$t(n) = \frac{n}{N+1}, (0 < n < N+1).$$

12. The method as recited in claim 1, wherein the inverse function of the direction map at said step d) satisfies equations as:

$$DM^{-1}(D) = A$$

$$DM(A) = DM(DM^{-1}(D)) = D,$$

wherein a function for mapping one polygon into a direction map is expressed as DM and a direction map is described as D.

13. The method as recited in claim 1, wherein at said step d), a polygon is generated based on equations as:

$$p_0 = p_{init}$$

$$p_{i+1} = p_i + d_i$$

$$p_{n0} = p_n + d_n$$

$$p_{i+m+1} = p_i + \sum_{j=i}^{i+m} d_j,$$

wherein an $i^{th}$ vertex of a polygon is described as $p_i$ and an $i^{th}$ direction vector of the direction map is described as $d_i$.

14. The method as recited in claim 1, wherein at said step d), a polygon is generated by subsequently generating in-betweens based on an equation as:

$$A(t) = DM^{-1}(D(t)),$$

wherein A(t) is an in-between and t is a scaling factor, wherein an inverse function for mapping a direction map into one polygon is expressed as $DM^{-1}$ and a direction map is described as D.

15. The method as recited in claim 14, wherein the in-betweens are generated by using Minkowski operation expressed as:

$$(1-t)A_0 \oplus tA_i = DM^{-1}(GS((DM(A_0) + DM(A_1)), (1-t, t)))$$

$$= DM^{-1}(GS(D_0) + D_1, (1-t, t)))$$

$$= DM^{-1}(GS(D, (1-t, t)))$$

$$= DM^{-1}(\overline{D(t)})$$

$$= A(t).$$

16. The method as recited in claim 14, wherein when a plurality of geometric shapes are morphed, a polygon is generated by Bezier control method based on equations as:

$$A(t) = DM^{-1}(SG(D,(B_0^M, \ldots, B_M^M(t)))),$$

$$\overline{D} = \sum_{i=0}^{M} DM(A_i) = \sum_{i=0}^{m} D_i,$$

$$B_i^M(t) = \binom{M}{i} t^i (1-t)^{M-i}.$$

17. The method as recited in claim 14, wherein when a plurality of geometric shapes are morphed, a polygon is generated by Blossom control method based on an equation as:

$$A(t_1, t_2, t_3) = A_0^3[t_1, t_2, t_3]$$

$$= DM^{-1}(SG(\overline{D}, (B_0^3(t_1, t_2, t_3), \ldots, B_3^3(t_1, t_2, t_3)))),$$

wherein a $3^{rd}$ order base function of Blossom is described as $B_0^3(t_1,t_2,t_3)$ and a $3^{rd}$ order Blossom is described as $A_0^3[t_1,t_2,t_3]$.

18. The method as recited in claim 1, further comprising the step of:

e) verifying the in-betweens generated by geometric shape morphing.

19. The method as recited in claim 18, wherein the generated in-betweens are verified by the normalized direction map based on an equation as:

$$N(DM(A(t))) = N(DM(DM^{-1}(DA(t))))$$

$$= N(D(t))$$

$$= N(\overline{D}),$$

wherein N is a normalizing function and a function for mapping one polygon into a direction map is expressed as DM, wherein a direction map is described as V and an inverse function for mapping a direction map into one polygon is expressed as $DM^{-1}$, wherein a polygon is described as A.

20. The method as recited in claim 18, wherein the generated in-betweens are verified by the number of vertices based on an equation as:

$$N_{lm} = N_l + N_m - N_c,$$

wherein the numbers of vertices of control shapes $A_l$ and $A_m$ are $N_l$ and $N_m$, and the number of line segments that have the same direction is $N_c$, the number of vertices of the generated polygon is $N_{lm}$.

21. The method as recited in claim 18, wherein the generated in-betweens are verified by the length of boundary line based on equations as:

$$A_{lm} = DM^{-1}(GS((DM(A_l) + DM(A_m)),(1-t,t))),$$

$$L_{lm} = (1-t)L_l + tL_m,$$

wherein when the boundary lengths of control shapes $A_l$ and $A_m$ are $L_l$ and $L_m$, $L_l$ and $L_m$ are interpolated by the boundary lengths $L_{lm}$ of the generated polygon $A_{lm}$ by merging two control shapes.

22. A computer readable recording medium for storing a program that implements a geometric shape morphing method for morphing at least two different geometric shapes by using direction maps in a morphing apparatus including a microprocessor, the geometric shape morphing method comprising the steps of:
- a) extracting a direction map from each of the geometric shapes;
- b1) rotating the direction maps according to an initial condition of merging;
- b2) arranging direction vectors;
- b3) merging the direction vectors to generate a merged direction map;
- c) performing group-based scaling of the merged direction map; and
- d) generating a polygon by using an inverse function of the merged direction map.

* * * * *